US011716973B2

(12) United States Patent
Shuttleworth et al.

(10) Patent No.: US 11,716,973 B2
(45) Date of Patent: Aug. 8, 2023

(54) APPARATUS AND METHOD FOR FLUID LEVEL MEASUREMENT AND CONTROL

(71) Applicant: SEL Environmental Limited, Blackburn (GB)

(72) Inventors: Andrew Bryan Shuttleworth, Blackburn (GB); Benjamin Scott Shuttleworth, Blackburn (GB)

(73) Assignee: SEL ENVIRONMENTAL LIMITED, Blackburn (GB)

(*) Notice: Subject to any disclaimer, the term of this patent is extended or adjusted under 35 U.S.C. 154(b) by 10 days.

(21) Appl. No.: 17/256,051

(22) PCT Filed: Jun. 28, 2019

(86) PCT No.: PCT/EP2019/067362
§ 371 (c)(1),
(2) Date: Dec. 24, 2020

(87) PCT Pub. No.: WO2020/002618
PCT Pub. Date: Jan. 2, 2020

(65) Prior Publication Data
US 2021/0267179 A1    Sep. 2, 2021

(30) Foreign Application Priority Data
Jun. 28, 2018  (EP) .................................. 18180480

(51) Int. Cl.
*A01K 63/04* (2006.01)
*G05D 9/12* (2006.01)
(52) U.S. Cl.
CPC ............. *A01K 63/047* (2013.01); *G05D 9/12* (2013.01)

(58) Field of Classification Search
CPC ......... Y10T 137/2534; Y10T 137/2577; Y10T 137/27; Y10T 137/7287; Y10T 137/731;
(Continued)

(56) References Cited

U.S. PATENT DOCUMENTS 168,746 A * 10/1875 Huested .................... E03F 5/22
137/115.02
929,883 A * 8/1909 Roach ...................... A01K 7/04
119/78

(Continued)

FOREIGN PATENT DOCUMENTS

CN           206941708 U        1/2018

OTHER PUBLICATIONS

International Search Report and Written Opinion of the International Searching Authority for PCT/EP2019/067362, dated Sep. 16, 2019 (SEL Environmental Limited) dated Sep. 16, 2019.
(Continued)

*Primary Examiner* — Hailey K. Do
(74) *Attorney, Agent, or Firm* — McAfee & Taft

(57) ABSTRACT

There is provided a liquid measurement and control apparatus (101) for measuring and controlling a level of liquid in an environment including plants or animals, the apparatus including: a first chamber (103) including a first liquid port (105) for liquid connection to the environment; a second chamber (107) integrally formed with the first chamber and including a second liquid port (109) for liquid connection to the environment; a level sensor (111) for measuring a first level of liquid in the first chamber; and an adjuster (113, 115, 117, 119, 121) for adjusting a second level of liquid in the second chamber, wherein, in use, flow of liquid between the first and second chambers within the apparatus is prevented such that the first level of liquid is representative of the level of liquid in the environment and the second level of liquid is adjustable to control the level of liquid in the environment.

20 Claims, 7 Drawing Sheets

(58) Field of Classification Search
CPC ...... Y10T 137/8342; G05D 9/00; G05D 9/12; A01K 63/047; A01K 7/025; A01K 7/04
See application file for complete search history.

(56) References Cited

U.S. PATENT DOCUMENTS

| | | | | |
|---|---|---|---|---|
| 973,474 | A * | 10/1910 | Cameron | B60K 15/077 137/550 |
| 3,895,402 | A * | 7/1975 | Page | G01F 23/241 137/448 |
| 4,325,894 | A * | 4/1982 | Date | G05D 9/12 261/DIG. 50 |
| 5,098,452 | A * | 3/1992 | Feller | G05D 9/12 264/205 |
| 5,744,701 | A * | 4/1998 | Peterson | G01M 3/3245 73/40 |
| 5,901,740 | A * | 5/1999 | Sanchelima | A23C 19/05 222/64 |
| 2011/0272043 | A1 * | 11/2011 | Hollingsworth | F24F 13/222 29/428 |
| 2012/0227734 | A1 * | 9/2012 | Bochud | C13B 25/06 137/1 |
| 2012/0308409 | A1 | 12/2012 | Levine | |
| 2014/0026988 | A1 * | 1/2014 | Peterson | F16H 57/0447 137/544 |
| 2016/0054169 | A1 * | 2/2016 | Gaudiau | F01P 11/18 73/313 |
| 2017/0118964 | A1 * | 5/2017 | Tsai | A01K 63/047 |
| 2018/0007873 | A1 * | 1/2018 | Pino | A01K 63/003 |

OTHER PUBLICATIONS

Search and Examination Report for European patent application No. 18/180,480 (SEL Environmental Limited) dated Jan. 14, 2019.

* cited by examiner

APPARATUS AND METHOD FOR FLUID LEVEL MEASUREMENT AND CONTROL

FIELD

This specification relates to apparatus and methods, specifically, apparatus and methods for liquid level measurement and control. The apparatus and method may be particularly advantageous in water level measurement and control.

BACKGROUND

Water is known to nourish environments and provide an important habitat for native plants and animals. Water may also be used to target specific outcomes, such as a desired plant growth, by providing the right amount of water at the right time for them to feed, breed and grow.

Water is naturally provided to an environment through the water cycle. In summary, water travels from a first environment on the Earth's surface to the atmosphere and then back to the ground again at a second environment. Solar energy provides a continuous exchange of moisture between the oceans, land, and atmosphere. However, the amount of water provided may be lower or higher than that which ensures ecosystems, including plants, are healthy and nourished. For example, if too little water is provided plants may wither, conversely if too much water is provide plants may die. Of course, these are extreme examples, it may be that whilst the level of water is not so low that plants may die or so high that the plants may drown as the level of water provided is suboptimal plant growth and health is suboptimal. There are existing methods of artificially controlling the amount of water provided to an environment. One such method uses a chamber having a level of water corresponding to that in the environment. The water level in the chamber is in liquid connection with an environment. The chamber includes a float arrangement and if the level of water is below a threshold, water is added to the chamber from a water supply.

SUMMARY

There is provided a liquid measurement and control apparatus for measuring and controlling a level of liquid in an environment including plants or animals, the apparatus including: a first chamber including a first liquid port for liquid connection with the environment; a second chamber integrally formed with the first chamber and including a second liquid port for liquid connection with the environment; a level sensor for measuring a first level of liquid in the first chamber; and an adjuster for adjusting a second level of liquid in the second chamber.

In use, the liquid level within the first chamber may be in constant near equilibrium with the level of liquid in the environment even when the level of liquid within the second chamber is being adjusted.

In use, flow of liquid between the first and second chambers within the apparatus may be prevented such that the first level of liquid is representative of the level of liquid in the environment and the second level of liquid is adjustable to control the level of liquid in the environment.

The adjuster may include one or more of: a liquid supply; a pump; a further port included in the second chamber; and/or an overflow port included in the second chamber.

The liquid supply may be configured to supply liquid to the second chamber.

The adjuster may include two pumps.

The adjuster may include a pump for pumping liquid out of the second chamber.

The adjuster may include a pump for pumping liquid into the second chamber, e.g. via the liquid supply.

The adjuster may include a flow meter and/or valve.

The level sensor may be or include: a pressure transducer; an ultrasonic sensor; a float sensor; an optical sensor; a capacitance sensor; a RADAR sensor; a LIDAR or LADAR sensor; a magnetic sensor; an electrical conductivity sensor; an electrical resistance sensor; and/or an acoustic sensor.

The liquid measurement and control apparatus for measuring and controlling a level of liquid in an environment may further include a controller configured to receive data from the level sensor.

The controller may be configured to transmit and/or receive data to or from the adjuster.

The controller may be configured to transmit and/or receive data from a remote device.

The first chamber may be within the second chamber; or the second chamber may be within the first chamber.

The adjuster may be within the first and/or second chamber.

There is also provided a method for measuring and controlling a level of liquid in an environment including plants or animals, the method including: determining a first level of liquid in a first chamber of a liquid measurement and control apparatus by a level sensor, said first chamber including a first port in liquid connection with the environment; adjusting a second level of liquid in a second chamber of the liquid measurement and control apparatus, which second chamber is integrally formed with the first chamber, the second chamber including a second port in liquid connection with the environment The liquid level within the first chamber may be in constant near equilibrium with the level of liquid in the environment even when the level of liquid within the second chamber is being adjusted.

Adjustment of the second level of liquid in the second chamber may control the level of liquid in the environment. Flow of liquid between the first and second chambers within the apparatus may be prevented such that the first level of liquid is representative of the level of liquid in the environment.

Determining the first level of liquid in the first chamber may include electronically sensing the first level of liquid in the first chamber.

The second level of liquid may be adjusted by adding or removing liquid from the second chamber.

The adjustment of the second level of liquid may be measured.

The amount of added or removed liquid to or from the second chamber may be controlled by actuating a valve and/or pump.

Adjusting the second level of liquid in the second chamber may include transferring liquid in and/or out of the second chamber.

Data may be received by a controller from: the electronic sensing of the first level of liquid in the first chamber; and/or a remote device.

Data may be transmitted from the controller to an actuator to instruct, permit or prevent adding or removing of liquid to or from the second chamber.

The method for measuring and controlling a level of liquid in an environment may further include transmitting data from the controller to a remote device.

There is also provided a computer program including instructions which, when the program is executed by a computer, cause the computer to carry out the method for measuring and controlling a level of liquid in an environment.

There is also provided a system for measuring and controlling a level of liquid in an environment including plants or animals, the system including: the liquid measurement and control apparatus for measuring and controlling a level of liquid in an environment including plants or animals; a first conduit in liquid connection with the first port and a first portion of the environment; and a second conduit in liquid connection with the second port and a second portion of the environment.

The liquid may be water.

The program may be executed by the controller and/or the remote device.

The first level of liquid in the first chamber may be in equilibrium with the level of liquid at the first portion of the environment.

The second level of liquid in the second chamber may be out of equilibrium with the level of liquid at the second portion of the environment.

The liquid measurement and control apparatus for measuring and controlling a level of liquid in an environment may be located separate from the environment.

A portion of the apparatus may be above and/or below ground surface level.

These and other aspects of the disclosure will be apparent from and elucidated with reference to the embodiment(s) described hereinafter.

BRIEF DESCRIPTION OF THE FIGURES

Embodiments will now be described by way of example only with reference to the accompanying drawings, in which.

DESCRIPTION OF EMBODIMENTS

There is provided a liquid measurement and control apparatus for measuring and controlling a level of liquid in an environment including plants or animals, the apparatus including: a first chamber including a first liquid port for liquid connection to the environment; a second chamber integrally formed with the first chamber and including a second liquid port for liquid connection to the environment; a level sensor for measuring a first level of liquid in the first chamber; and an adjuster for adjusting a second level of liquid in the second chamber, wherein, in use, flow of liquid between the first and second chambers within the apparatus is prevented such that the first level of liquid is representative of the level of liquid in the environment and the second level of liquid is adjustable to control the level of liquid in the environment.

Figure 1:
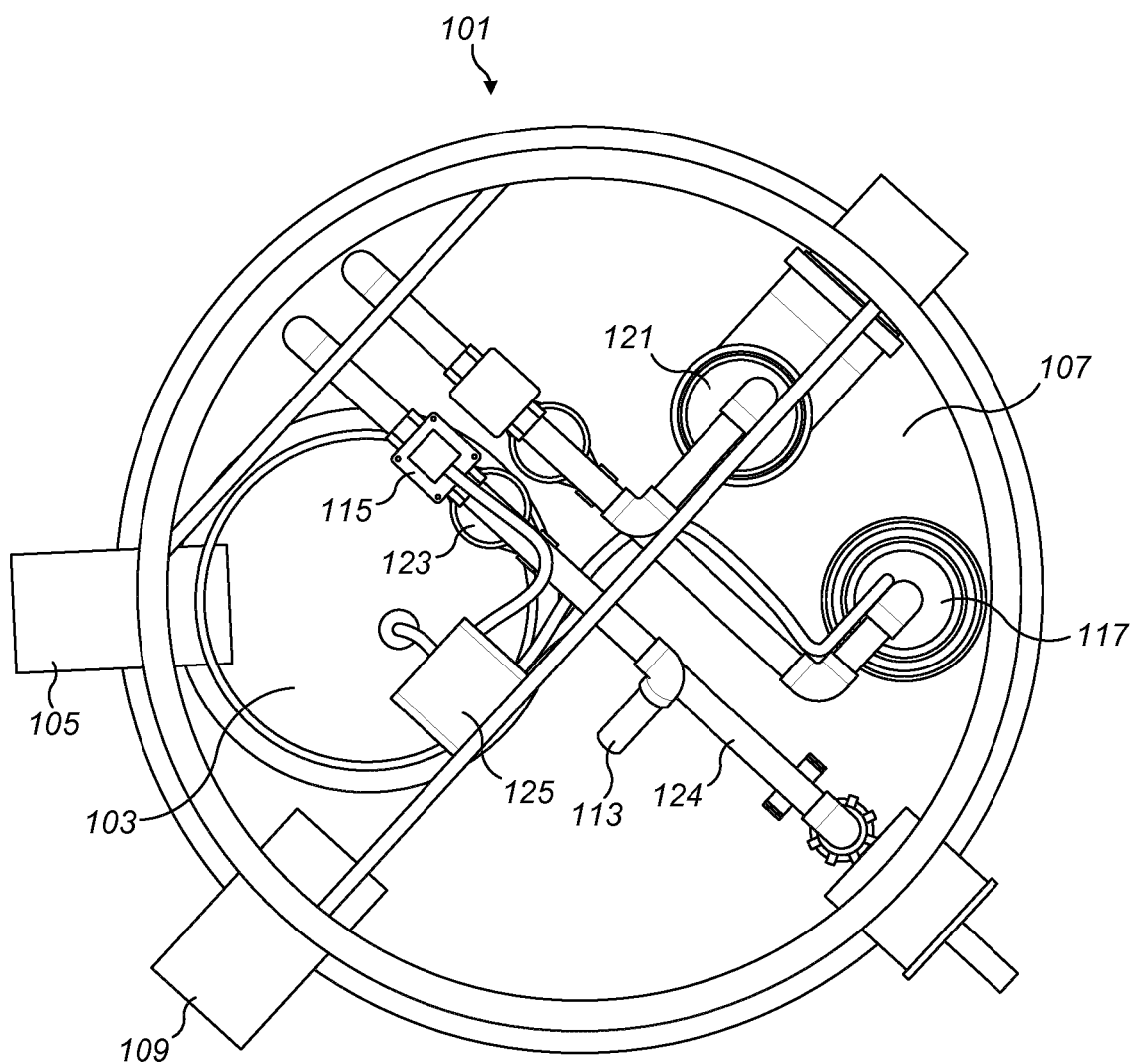
FIG. 1 shows a plan view of a liquid measurement and control apparatus for measuring and controlling a level of liquid in an environment.
Figure 2:
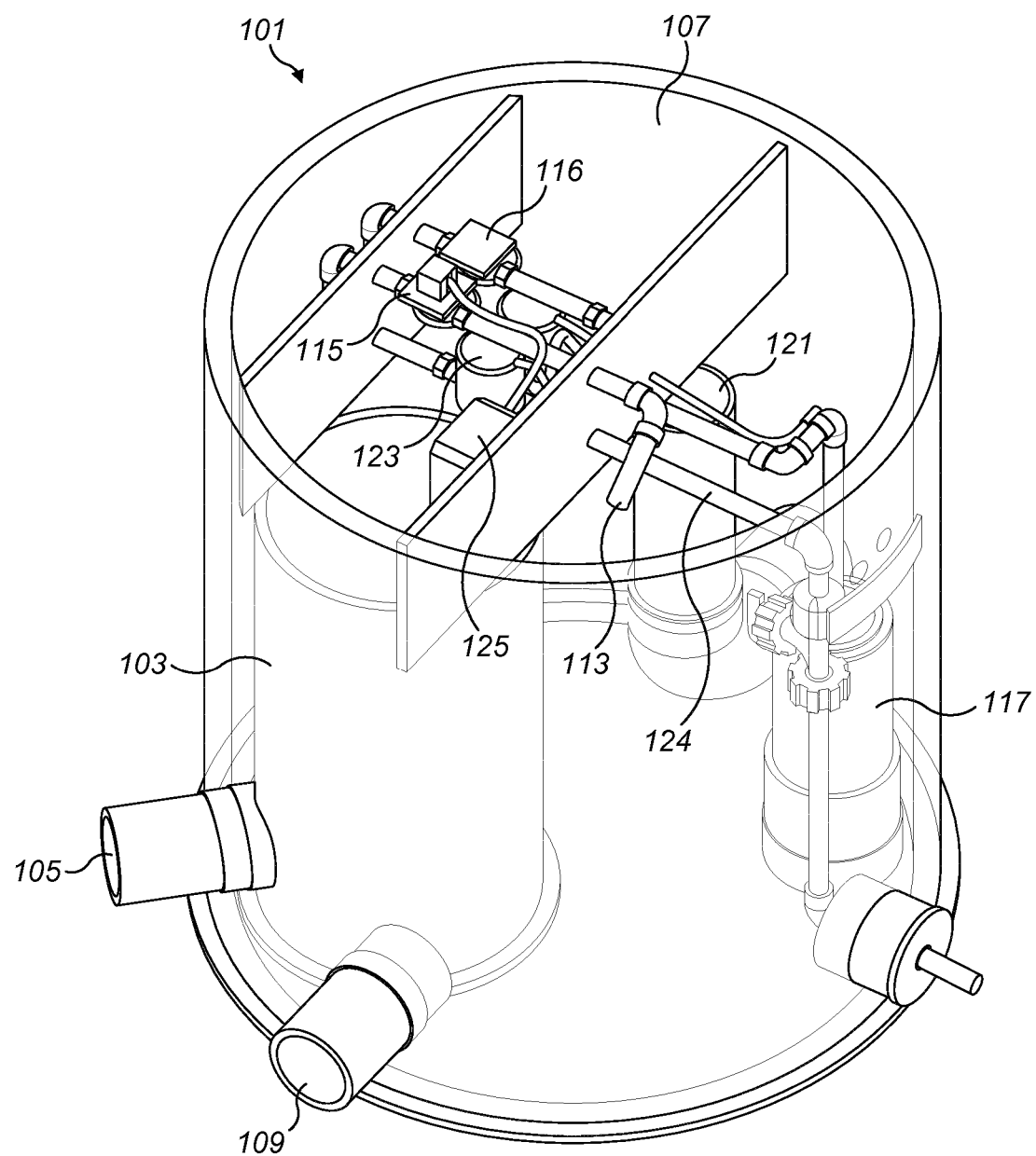
FIG. 2 shows an isometric view of the apparatus of FIG. 1.
Figure 3:
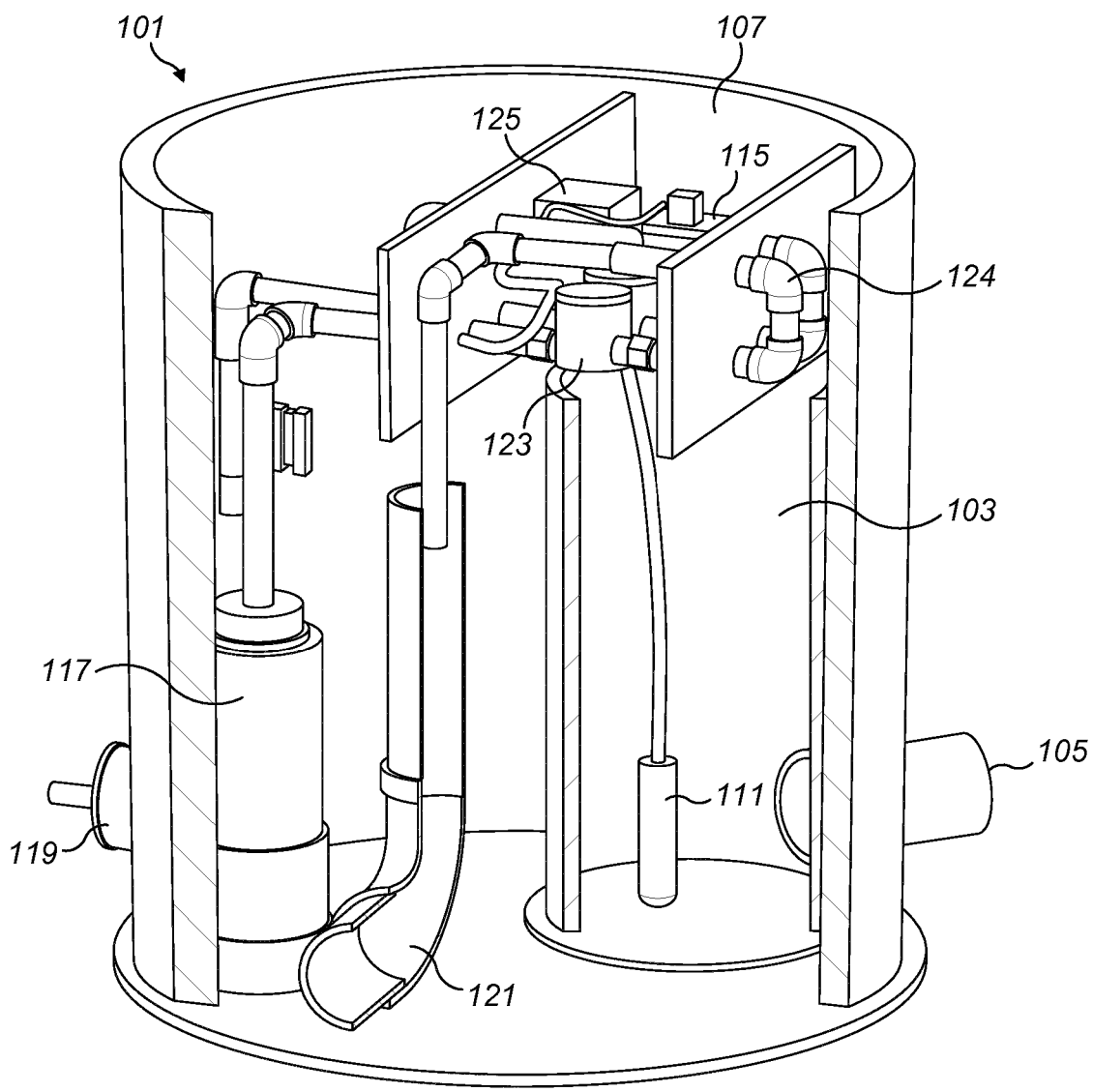
FIG. 3 shows a partially cut-away view of the apparatus of FIG. 1.
Figure 4:
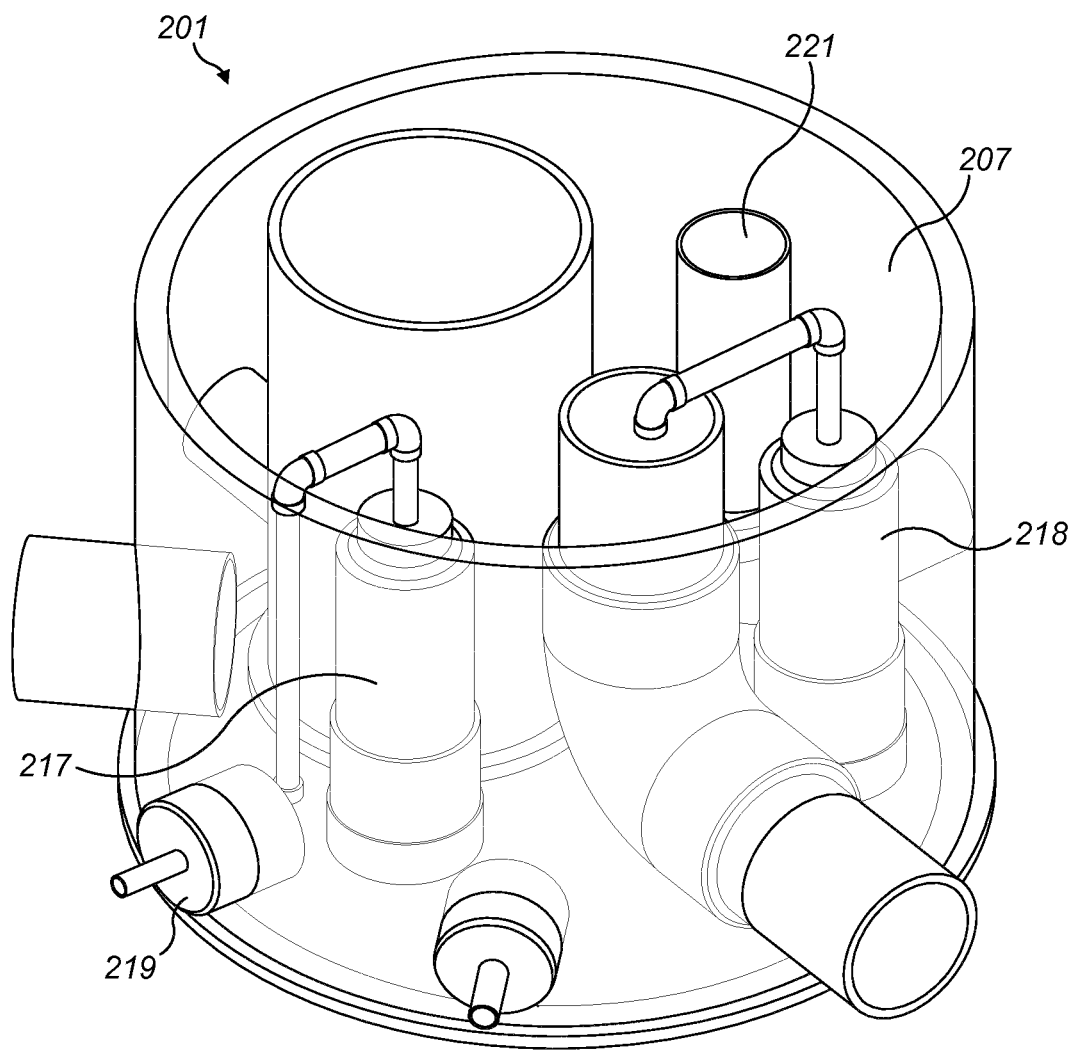
FIG. 4 shows an isometric view of another liquid measurement and control apparatus for measuring and controlling a level of liquid in an environment.

Referring firstly to FIGS. 1 to 3 of the drawings, a liquid measurement and control apparatus, indicated generally at 101, is for measuring and controlling a level of liquid in an environment.

The apparatus 101 includes a first chamber 103. The first chamber 103 includes a first liquid port 105 for liquid connection to the environment. Connection to the environment is described in more detail below.

The apparatus 101 also includes a second chamber 107 integrally formed with the first chamber 103 and includes a second liquid port 109 for liquid connection to the environment.

The apparatus 101 also includes a level sensor 111 for measuring a first level of liquid in the first chamber 103.

The apparatus 101 further includes at least one adjuster 113, 115, 117, 119, 121 for adjusting a second level of liquid in the second chamber 107.

The apparatus 101 may be advantageous.

In prior art apparatus having only one chamber a level sensor and adjuster are both in the same chamber. With such an arrangement, when the liquid level in the chamber is adjusted, for example increased, the level sensor senses an increase in liquid level soon after the level of liquid is increased within the chamber.

As has been appreciated by the inventors of the present disclosure, the level of liquid within the chamber increases before the level of liquid within the environment, consequently, the measured level of liquid is greater than the level of liquid within the environment during the addition of liquid.

As a result of (possibly incorrectly) measuring an increased level of liquid, increasing (adjustment) of the level of liquid in the chamber may be ceased. Upon ceasing of increasing the level of liquid within the prior art chamber, the level of liquid in the chamber and the environment equilibrates.

Once the level of liquid has equilibrated, the sensed level may be lower and adjustment may need to be resumed. This results in intermittent adjustment of the level of liquid within the chamber and consequently within the environment.

As a result of this intermittent adjustment, the adjustment of the level of liquid within the environment may be slower than desired. However, in use of the apparatus 101, the liquid level within the first chamber 103 may be in constant near equilibrium with the level of liquid in the environment even when the level of liquid within the second chamber 107 is being adjusted. The apparatus 101 may be able to operate in this way because liquid flow between the first chamber 103 and the second chamber 107 within the apparatus 101 is prevented (i.e. liquid can only flow between the first chamber 103 and the second chamber 107 via the environment). This means that the first chamber 103 may be effectively isolated from the second chamber 107. Isolating the first chamber 103 from the second chamber 107 in this way means that the first chamber 103 may be in constant near equilibrium with the environment thereby providing an accurate indication of the liquid level in the environment.

Consequently, it may be possible to adjust the level of liquid in the environment whilst simultaneously monitoring the level of liquid in the environment using the apparatus 101.

It may be advantageous to adjust the level of liquid in the environment. In particular, the environment may include plants or animals and the liquid may be water. Water may be required to nourish the environment and encourage healthy growth of the plants or animals. Some environments may not have access to the water necessary for nourishment. Conversely, an environment may have too much water suitable for an environment. An unsuitable amount of water in an environment may have detrimental effects to the environment. In other applications other liquids may be used and there may be other reasons for adjusting the level of liquid, as will be apparent to the skilled person.

The apparatus 101 may provide a more accurate way to monitor and adjust a level of liquid in an environment.

Additionally, the apparatus 101 can provide a self-contained system which enables both the measurement of a level of liquid within an environment and also the adjustment of the level of liquid within that same environment.

Further, the apparatus 101 can be assembled away from the environment and then subsequently positioned within a working distance of the environment. In this way, an easy to install apparatus can be provided.

Yet further, the apparatus 101 may be compact and self-contained. In this way, an advantageous apparatus can be provided.

As shown, the adjuster 113, 115, 117, 119, 121 of the apparatus 101 may include a liquid supply 113. The liquid supply 113 may be pressurised or unpressurised. For example, the liquid supply 113 may be a pressurised mains liquid supply. In the case where the liquid supply 113 is a pressurised supply it may be enough for the adjuster to include solely a valve 115. Of course, a valve 115 may be used in combination with other features to make up the or a adjuster. A possible advantage to using a pressurised liquid supply 113 and a valve 115 is that a simple and economic means of adjusting the supply can be provided.

The liquid supply 113 may be a re-use liquid supply. The re-use liquid supply may include a remote storage tank (not shown). The re-use liquid supply may store liquid transferred from the second chamber 107 when the second liquid level is higher than desired. Liquid in the re-use storage tank may be used for adjusting the second liquid level in the second storage chamber 107. In particular, liquid stored in the re-use storage tank may be used as the liquid supply 113 or liquid from the chamber may be transferred to the re-use storage supply.

This may be advantageous as it can provide a green and economic means of recycling liquid.

The adjuster 113, 115, 117, 119, 121 of the apparatus 101 may include a pump 117. The pump 117 may transfer liquid out of the second chamber 107. The pump 117 may transfer liquid by pumping. Liquid in the second chamber 107 may be transferred to a further port 119 and/or an overflow port 121. The further port 119 and/or an overflow port 121 may be included in the second chamber 107.

The further port 119 may be an input or output port. The further port 119 may be in the second chamber 107. The further port 119 may be, for example, an input port for liquid connection of the second chamber 107 with a re-use storage tank, e.g. via a conduit.

The overflow port 121 may be a port in a wall of the second chamber 107. The overflow port 121 may extend into the second chamber 107. Further, the overflow port 121 may firstly extend away from an internal wall of the second chamber 107, then in a vertical direction.

This may have the advantage that a level within the second chamber 107 may be defined at which an overflow level threshold is set. For example, the opening to the overflow port 121 may be included at an optimum liquid level for the adjuster. Likewise, the opening for the overflow port 121 may be at a level that corresponds to a threshold related to a maximum desired liquid in the environment.

The adjuster 113, 115, 117, 119, 121 may also include a pump 117 for transferring liquid into the second chamber 107. This may be from an external liquid supply 113. An example including the pump 117 with the external liquid supply 113 may be suitable when using an unpressurised liquid source, such as the re-use storage tank.

The adjuster 113, 115, 117, 119, 121 may include a liquid conduit. The liquid conduit may liquidly connect the or an adjuster to an external liquid supply.

The adjuster 113, 115, 117, 119, 121 may include a flow meter 123 and/or the valve 115.

It may be advantageous to include the flow meter 123 with the adjuster 113, 115, 117, 119, 121.

The flow meter 123 may be used to track the amount of liquid entering and/or exiting the second chamber 107. As such, when used in combination with the valve 115, a defined amount of liquid may be added or removed from the second chamber 107.

At least two of the flow meter 123 and/or valve 115 and/or adjuster 113, 115, 117, 119, 121 may be in liquid connection with each other. The flow meter 123 may precede the valve 115 with respect to the direction of flow. Further, the valve may precede the adjuster 113, 115, 117, 119, 121 with respect to the direction of flow.

Liquid connection of the at least two of the flow meter 123 and/or valve 115 and/or adjuster 113, 115, 117, 119, 121 may be achieved through a chamber conduit 124, for example, a pipe. A portion of the chamber conduit 124 may extend in a level plane substantially parallel to the surface of the Earth.

It may be advantageous to include the flow meter 123 and/or valve 115 on a level plane of the chamber conduit 124.

It may be further advantageous to include the flow meter 123 and/or valve 115 at a distal end of the portion of chamber conduit 124 with respect to the direction of flow. It will be appreciated that a level settlement period for the liquid through the chamber conduit 124 is advantageous in order to gain a more accurate measurement of flow rate from the flow meter 123. This is so as some flow meters 123 function more accurately if the flow before and after the flow meter is straight as opposed to curved or bent.

The adjuster 113, 115, 117, 119, 121 may include a stop valve at a point of entry or exit into or out of the second chamber 107.

The level sensor 111 may be in the first chamber 103. The level sensor 111 may transmit a signal out of the first chamber 103. The level sensor 111 may be remote from the first chamber 103 but have a sensing range extending to the first chamber 103.

The level sensor 111 may be or include a pressure transducer. A pressure transducer may be preferred as it is a relatively economic type of sensor. The level sensor 111 may be submerged under the first liquid level in the first chamber 103, and convert a liquid pressure into an electrical signal.

The level sensor 111 may be an ultrasonic sensor. A signal may be sent from the level sensor 111 to a surface of the liquid in the first chamber and a distance calculated based on a return signal. It is appreciated that sonar methods may be included in the level sensor 111, and that it may be either submerged or positioned above the first liquid level in the first chamber 103.

Further examples of a level sensor 111 may include a float sensor, an optical sensor, a capacitance sensor, a RADAR sensor, a LIDAR or LADAR sensor, a magnetic sensor, an electrical conductivity sensor, an electrical resistance sensor, and/or an acoustic sensor.

As shown, the apparatus 101 may further include a controller 125. The controller 125 may be configured to receive data from the level sensor 111 and/or flow meter 123. The controller 125 may convert level sensor 111 and/or flow meter 123 data into a processable format suitable for analysis.

It may be advantageous to analyse the level sensor 111 and/or flow meter 123 data to analyse trends in the environment liquid level and the amount of liquid being added or removed to or from the second chamber 107.

The controller 125 may be configured to transmit and/or receive data to or from the adjuster 113, 115, 117, 119, 121. Further, the controller 125 may transmit an instruction to the adjuster 113, 115, 117, 119, 121 for the adjuster 113, 115, 117, 119, 121 to perform a function.

The controller 125 may decide the sequence of operations carried out by the adjuster 113, 115, 117, 119, 121. This may be based on the level sensor 111 and/or flow meter 123 data. The controller 125 may be used to automate the adjuster 113, 115, 117, 119, 121.

The controller may be configured to transmit and/or receive data to or from a remote device (not shown). The remote device may be, for example, a computer device or a portable computer device (e.g. a mobile phone optionally including a specialist app). Instructions may be sent to the controller 125 from the remote device in order to execute an operation of the adjuster 113, 115, 117, 119, 121 or desired characteristics. The desired characteristics may, for example, be a level of liquid in the environment.

Additionally, data processed by the controller 125 from the level sensor 111 and/or flow meter 123 may be transmitted to the remote device from the controller 125. Data may include a current first level of liquid in the first chamber 103, and thus the environment. Other data may include the amount of liquid added to the second chamber 107 from the liquid supply 113 over a period of time. Other data may also include the amount of liquid removed from the second chamber 107 with the pump 117 over a period of time.

It may be advantageous to track the level of liquid in the environment over a period of time.

The first chamber 103 may be within the second chamber 107. This may include the first chamber 103 being integrated with, a portion of, or coupled with the second chamber 107. The first chamber 103 may be enclosed within the second chamber 107. The first liquid port 105 may extend through a portion of the second chamber 107.

It may be advantageous to include the first chamber 103 within the second chamber 107 to provide suitable placement for the overflow port 121.

The apparatus 201 may include two pumps 217, 218. At least one of the pumps 217 may be for pumping liquid into the second chamber 207. At least one of the pumps 218 may be for pumping liquid out of the second chamber 207.

The same pump 217 may transfer liquid in and/or out of the second chamber 207. For example, a valve arrangement may be provided that enables liquid to be taken from the second chamber and expelled, and allows liquid to be taken from another source and the second chamber to be filled. Further, the pump 217 may include an inlet and an outlet.

The pump 217 may be a bi-directional pump. The pump 217 may include a single liquid inlet and multiple liquid outlets. The pump 217 may include multiple liquid inlets, for example from the re-use-liquid supply and an unpressurised source, and a single liquid outlet. It will, therefore, be appreciated that the pump 217 may include multiple liquid inlets and multiple liquid outlets.

It may be advantageous to include a single pump in the second chamber 207 to reduce the footprint of the pump 217 in the second chamber 207.

Figure 5:
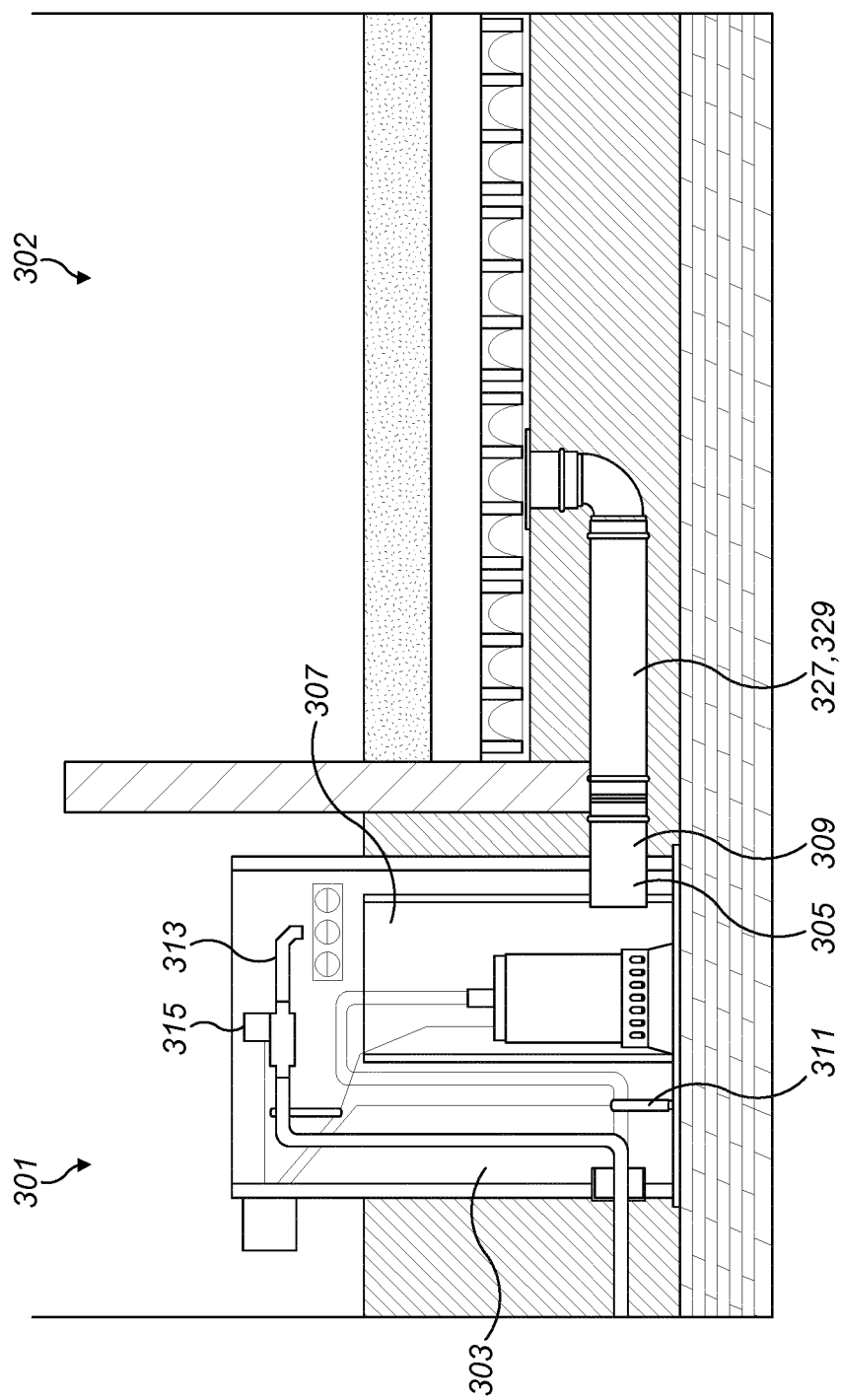
FIG. 5 shows a schematic view of a system for measuring and controlling a level of liquid in an environment, including a liquid measurement and control apparatus, and the environment.

Referring to FIG. 5, the second chamber 307 may be within the first chamber 303, and the level sensor 311, the liquid supply 313, and the valve 315 included in the outer first chamber 303. The apparatus 301 may remain in liquid connection with the environment 302.

The adjuster may be within the first chamber 303 and/or second chamber 307. The adjuster may be confined in the first chamber 303 and/or second chamber 307. The adjuster may be above the first chamber 303 and/or second chamber 307.

Providing the adjuster within the first chamber 303 and/or second chamber 307 may be advantageous so to provide rapid adjustment of the liquid level. Further, easier installation of the apparatus 301 may be achieved and the adjuster may be protected by the first and/or second chambers 303, 307.

Figure 6:
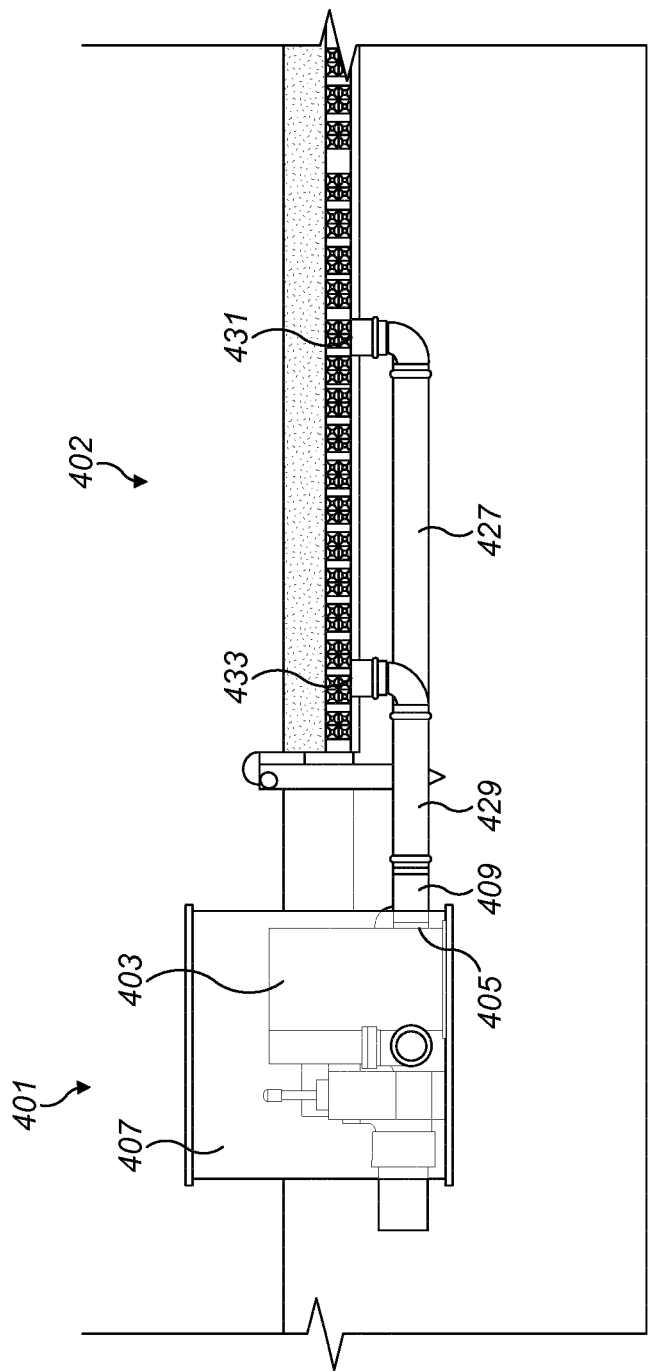
FIG. 6 shows a schematic view of another system for measuring and controlling a level of liquid in an environment, including a liquid measurement and control apparatus, and the environment.
Figure 7:
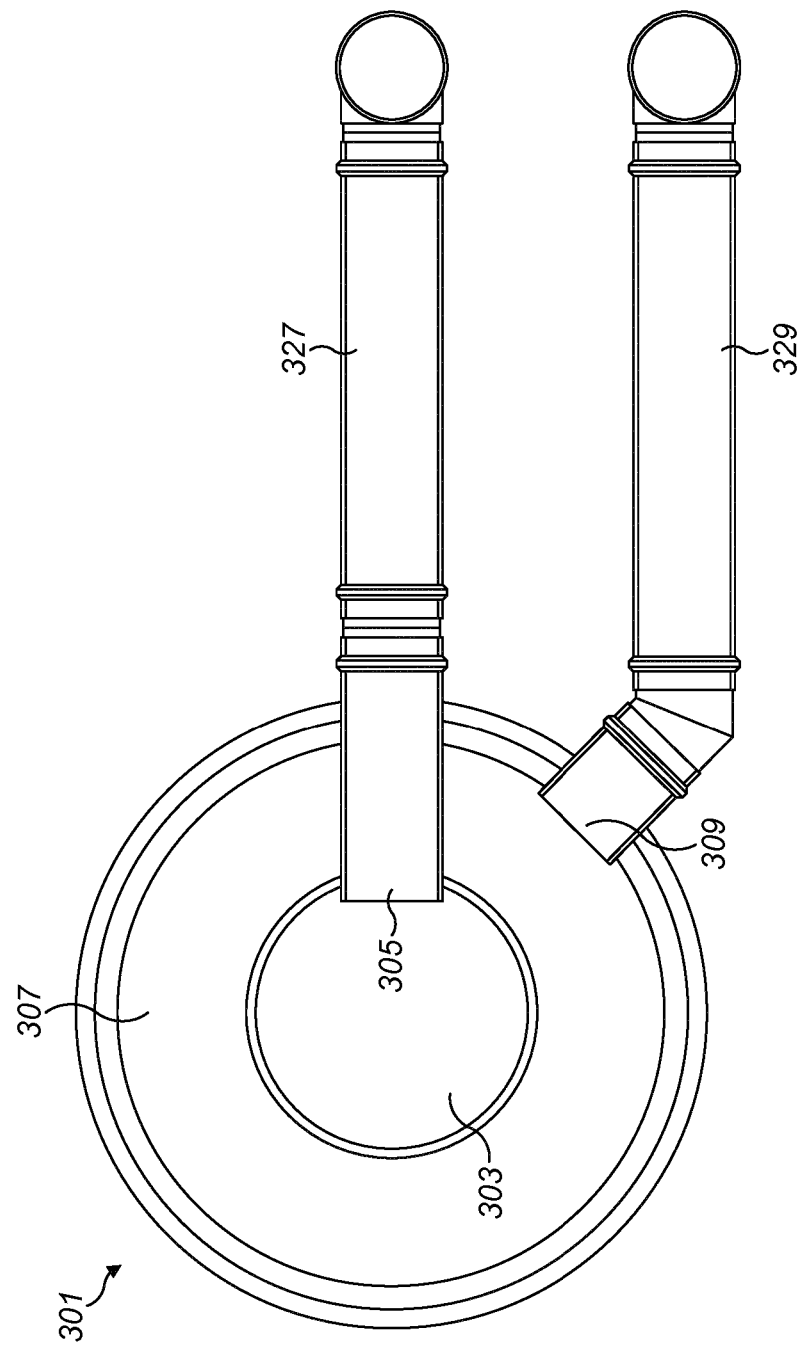
FIG. 7 shows a plan view the apparatus for measuring and controlling a level of liquid in an environment as shown in the system of FIG. 5.

Now referring to FIGS. 5, 6 and 7, the first chamber 303, 403 includes a first port 305, 405 liquidly connected to the environment 302, 402. The first port 305, 405 may be an inlet or outlet for adding or removing liquid to or from the first chamber 303, 403. Further, the first port 305, 405 may be in liquid connection with the environment 302, 402 via a first connecting conduit 327, 427. The first connecting conduit 327, 427 may be, for example, a pipe.

Additionally, the second chamber 307, 407 may include a second port 309, 409 in liquid connection with the environment 302, 402. The second port 309, 409 may be an inlet or outlet for adding or removing liquid to or from the second chamber 307, 407. Further, the second port 309, 407 may be in liquid connection with the environment 302, 402 via a second connecting conduit 329, 429. The second connecting conduit 329, 429 may be, for example, a pipe.

A method for measuring and controlling a level of liquid in an environment is also provided.

A step of the method for measuring and controlling a level of liquid in an environment is determining a first level of liquid in a first chamber 103.

Determining the first level of liquid may include visual inspection of the first level of liquid. Further, determining the first level of liquid may include a marker for measuring the first level of liquid relative to the marker. Of course, it is appreciated that multiple markers may be used along a depth of the first chamber.

Determining the first level of liquid in the first chamber 103 may include electronically sensing the first level of liquid in the first chamber 103.

The first level of liquid in the first chamber 103 may be generally in equilibrium with the level of liquid in the environment. This may be achieved by preventing flow of liquid between the first chamber 103 and the second chamber 107 within the apparatus 101 such that the first level of liquid is representative of the level of liquid in the environment. Inspection of the first level of liquid in the first chamber 103, therefore, indirectly corresponds to inspection of the level of liquid in the environment. Advantages of measuring the liquid level in the environment are discussed above.

Another step of the method for measuring and controlling a level of liquid in an environment is adjusting a second level of liquid in a second chamber 107. Adjusting the second level of liquid in the second chamber 107 may be performed with an adjuster 113, 115, 117, 119, 121 as explained above.

The second chamber 107 is integrally formed with the first chamber 103 as explained above, and the second chamber 107 includes a second port 109 in liquid connection with the environment.

It will be appreciated from the explanation above that, by adjusting the second level of liquid in the second chamber 107, the liquid level in the environment may be adjusted.

The second level of liquid may be adjusted by adding or removing liquid to or from the second chamber 107. Adding liquid to the second chamber 107 may raise the second level of liquid in the second chamber 107. This results in liquid in the second chamber 107 flowing to the environment. Further, liquid may flow from the second chamber 107, through the second liquid port 109, via a second connecting liquid conduit 129, to the environment. Removing liquid from the second chamber 107 may reduce the level of liquid in the second chamber 107. When the liquid level in the second chamber 107 is lower than that of the environment, liquid in the environment flows to the second chamber 107. Advantages of this method are discussed above in relation to the described apparatus.

The adjustment of the second level of liquid may be measured. This may include measuring the amount of liquid added or removed. Measuring may be performed using the apparatus 101 included above.

The amount of added or removed liquid to or from the second chamber 103 may be controlled by actuating a valve 115 and/or pump 117. Actuating the valve 115 and/or pump 117 may be though manual or automatic methods. Automatic methods may include an electrical system and/or computer.

Adjusting the second level of liquid in the second chamber 107 may include transferring liquid in and/or out of the second chamber 107. Transferring may include pumping liquid in and/or out of the second chamber 107. Transferring of liquid in and/or out of the second chamber 107 may occur concurrently or individually. Likewise, it will be appreciated that adjusting the second level of liquid in the second chamber 107 may also include transferring liquid in and/or out of the environment.

Data may be received by a controller 125 from the electronic sensing of the first level of liquid in the first chamber 103. The data received may include an analogue or digital signal indicative of the level of liquid in the first chamber 103. Data may be processed by the controller 125.

Data may also be received by the controller 125 from a remote device (not shown). Data received from the remote device may include a request for level sensor 111 data and/or flow meter 123 data. Data received from the remote device may also include instructional data. The controller 125 may organise and/or prioritise data.

Data may be transmitted from the controller 125 to an actuator to instruct, permit or prevent adding or removing of liquid to or from the second chamber 107. This may include transmitting the same instructional data received from the remote device. The controller 125 may also transmit instructions simultaneously or individually.

The controller may receive a signal from the level sensor 111 indicative of the level of liquid in the first chamber 103. Data may then be processed by the controller 125. The controller 125 may then transmit an instruction to the actuator to instruct, permit or prevent adding or removing of liquid to or from the second chamber 107 based on the level of liquid in the first chamber 103.

The controller 125 may transmit data to a remote device. This may be transmitted wirelessly or via a wired connection. Examples of data transmitted from the controller 125 to the remote device may include processed level sensor 111 data and/or flow meter 123 data. Additionally, data may be transmitted to the remote device indicating operation of the actuator. This may be a successful or unsuccessful operation. An indication of a malfunction of the controller 125, level sensor 111 and/or adjuster 113, 115, 117, 119, 121 may be transmitted to the remote device.

A computer program is also provided. The computer program includes instructions which, when the program is executed by a computer, cause the computer to carry out a method described above for measuring and controlling a level of liquid in an environment.

The computer program may be stored on a non-transitory computer-readable medium included in the controller 125 and/or remote device. When executed by the controller, the controller may automatically optimise the second level of liquid in the second chamber 107 based on the first level of liquid in first chamber 103, for optimal nourishment of the environment.

The apparatus 401, first conduit 427 in liquid connection with the first port 405 and a first portion of the environment 431, and the second conduit 429 in liquid connection with the second port 409 and a second portion of the environment 433 provide a system for measuring and controlling a level of liquid in an environment.

The first level of liquid in the first chamber 403 may be in equilibrium with the level of liquid at the first portion of the environment 431 as explained above.

The second level of liquid in the second chamber 407 may be out of equilibrium with the level of liquid at the second portion of the environment 433, due to continuous adjustment, as explained above.

A portion of the apparatus 401 may be above and/or below a ground surface level. The first and second conduits 427, 429 may be generally below a ground surface level. The apparatus 401, first conduit 427, and second conduit 429 may be below a ground surface level. The first and second conduits 427, 429 may be substantially level below a ground surface level.

In any of the above-described embodiments, liquid flow between the first chamber and the second chamber within the apparatus may be prevented by removing excess liquid from the apparatus before mixing of liquid between the first and second chambers can occur.

Removal of excess liquid from the apparatus may be achieved by removing liquid from one or both of the first chamber and the second chamber. Removal of excess liquid may be achieved by pumping using any pump described herein and/or by egress via any further port and/or overflow port described herein. In some embodiments, excess liquid may be removed elsewhere (e.g. at one or more locations in the environment).

Alternatively or additionally, liquid flow between the first chamber and the second chamber within the apparatus may be prevented by providing a physical barrier, such as a wall or other separating part, between the first chamber and the second chamber.

Examples of liquids include water, oil, coolant, fuel, antifreeze, effluent and the like.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the disclosure in diverse forms thereof.

The invention claimed is:

1. A liquid measurement and control apparatus for measuring and controlling a level of liquid in an environment including plants or animals, the liquid measurement and control apparatus comprising:
   a first chamber including a first liquid port for liquid connection with the environment;
   a second chamber integrally formed with the first chamber and including a second liquid port for liquid connection with the environment;
   a level sensor for measuring a first level of liquid in the first chamber;
   an adjuster for adjusting a second level of liquid in the second chamber, wherein the adjuster is within the first chamber and/or the second chamber; and
   wherein, in use, the liquid level within the first chamber is in constant near equilibrium with the level of liquid in the environment so as to provide an accurate indication of the level of liquid in the environment even when the level of liquid within the second chamber is being adjusted.

2. The liquid measurement and control apparatus of claim 1, wherein, in use, direct flow of liquid between the first and second chambers within the liquid measurement and control apparatus is prevented such that the first level of liquid is representative of the level of liquid in the environment and the second level of liquid is adjustable to control the level of liquid in the environment.

3. The liquid measurement and control apparatus of claim 1, wherein the adjuster includes two pumps.

4. The liquid measurement and control apparatus of claim 1, wherein the adjuster includes a pump for pumping liquid out of the second chamber.

5. The liquid measurement and control apparatus of claim 1, wherein the adjuster includes a pump for pumping liquid into the second chamber.

6. The liquid measurement and control apparatus of claim 1, wherein the adjuster includes a flow meter and/or valve.

7. The liquid measurement and control apparatus of claim 1, further comprising:
   a controller configured to receive data from the level sensor.

8. The liquid measurement and control apparatus of claim 7, wherein the controller is configured to transmit and/or receive data from a remote device.

9. The liquid measurement and control apparatus of claim 7, wherein the controller is configured to transmit and/or receive data to or from the adjuster.

10. A liquid measurement and control apparatus for measuring and controlling a level of liquid in an environment including plants or animals, the liquid measurement and control apparatus comprising:
    a first chamber including a first liquid port for liquid connection with the environment;
    a second chamber integrally formed with the first chamber and including a second liquid port for liquid connection with the environment;
    a level sensor for measuring a first level of liquid in the first chamber;
    an adjuster for adjusting a second level of liquid in the second chamber, wherein the adjuster further includes one or more of:
    a liquid supply;
    a pump;
    a further port included in the second chamber; and/or
    an overflow port included in the second chamber; and
    wherein, in use, the liquid level within the first chamber is in constant near equilibrium with the level of liquid in the environment so as to provide an accurate indication of the level of liquid in the environment even when the level of liquid within the second chamber is being adjusted.

11. The liquid measurement and control apparatus of claim 10, wherein the liquid supply is configured to supply liquid to the second chamber.

12. The liquid measurement and control apparatus of claim 10, wherein, in use, direct flow of liquid between the first and second chambers within the liquid measurement and control apparatus is prevented such that the first level of liquid is representative of the level of liquid in the environment and the second level of liquid is adjustable to control the level of liquid in the environment.

13. The liquid measurement and control apparatus of claim 10, wherein the adjuster includes two pumps.

14. The liquid measurement and control apparatus of claim 10, wherein the pump is configured to pump liquid out of the second chamber.

15. The liquid measurement and control apparatus of claim 10, wherein the pump is configured to pump liquid into the second chamber.

16. The liquid measurement and control apparatus of claim 10, wherein the adjuster further includes a flow meter and/or valve.

17. The liquid measurement and control apparatus of claim 10, wherein the adjuster is within the first chamber and/or the second chamber.

18. The liquid measurement and control apparatus of claim 10, further comprising:
    a controller configured to receive data from the level sensor.

19. The liquid measurement and control apparatus of claim 18, wherein the controller is configured to transmit and/or receive data from a remote device.

20. The liquid measurement and control apparatus of claim 18, wherein the controller is configured to transmit and/or receive data to or from the adjuster.

* * * * *